Feb. 28, 1928. 1,660,600
J. E. DOMAGALL
ANGLE INDICATING MEANS FOR FRONT WHEELS
Filed May 1, 1925   2 Sheets-Sheet 1
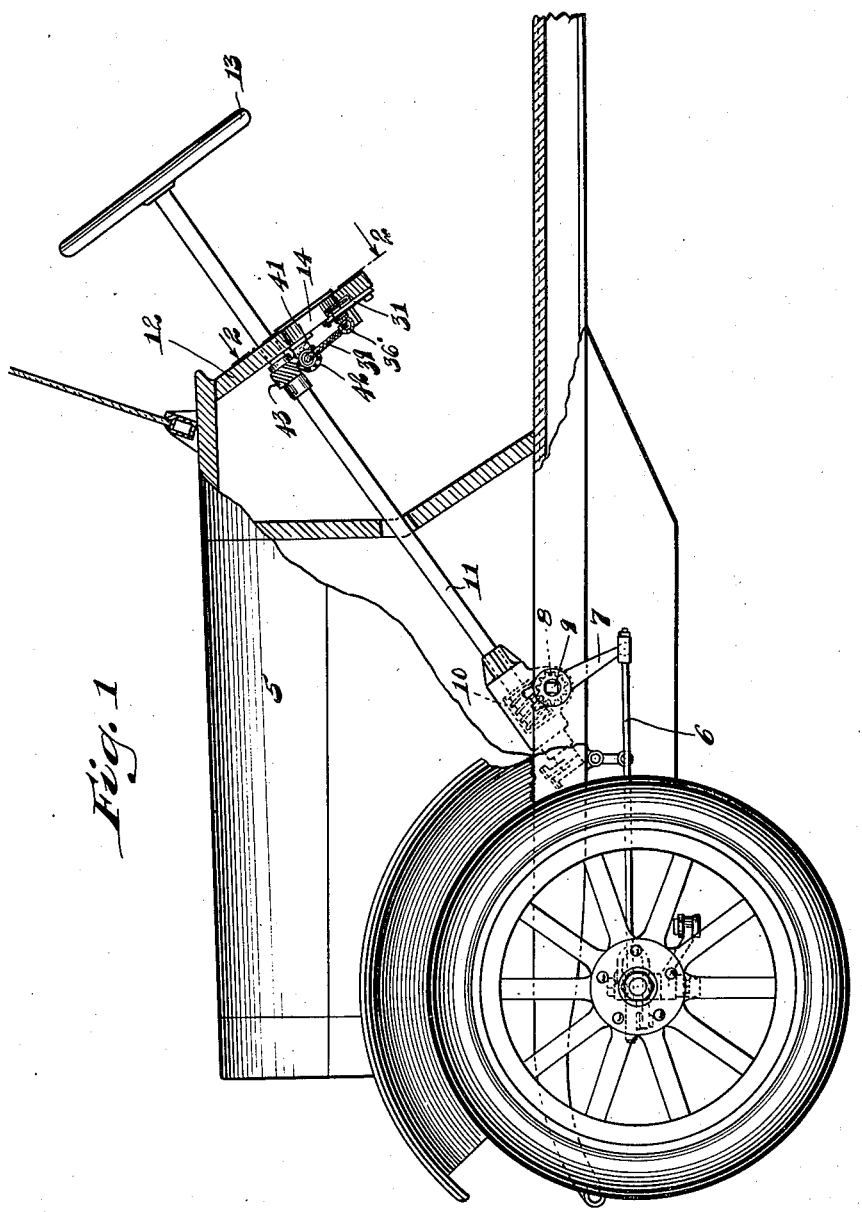
Witnesses:
C. E. Wessels
Inventor:
John E. Domagall,
By Joshua R. H. Potts
his Attorney.

Feb. 28, 1928.
J. E. DOMAGALL
1,660,600
ANGLE INDICATING MEANS FOR FRONT WHEELS
Filed May 1, 1925
2 Sheets-Sheet 2
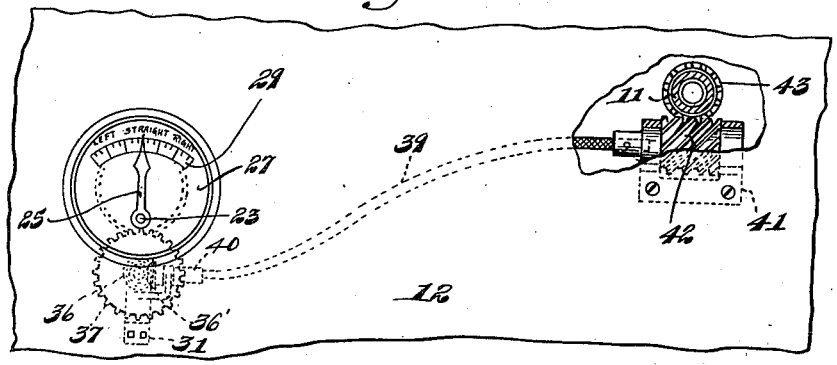
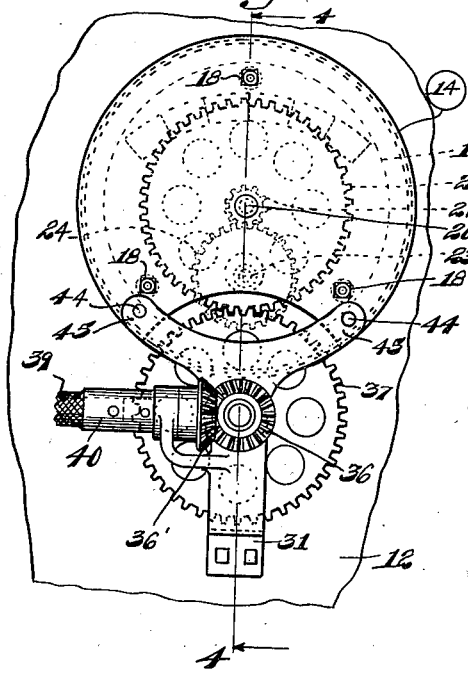
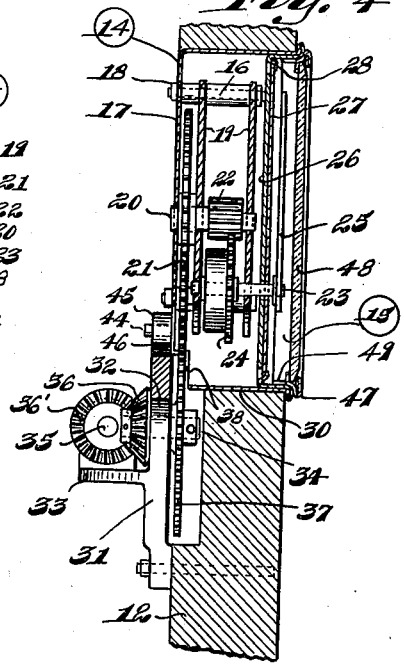
Witnesses:
Inventor:
John E. Domagall,
his Attorney.

Patented Feb. 28, 1928.

1,660,600

UNITED STATES PATENT OFFICE.

JOHN E. DOMAGALL, OF PERU, ILLINOIS.

ANGLE-INDICATING MEANS FOR FRONT WHEELS.

Application filed May 1, 1925. Serial No. 27,132.

My invention relates to angle indicating means for front wheels, adapted especially for use on motor vehicles and designed to be operated by the steering mechanism of the motor vehicle to indicate the position of the front wheels with respect to the rear wheels, and the main object of my invention is the provision of an improved construction of this kind which will be automatic and highly efficient in operation.

Other objects will appear hereinafter.

The invention consists in the combinations and arrangements of parts hereinafter described and claimed.

The invention will be best understood by reference to the accompanying drawings, forming a part of this specification, and in which, Fig. 1 represents a fragmental side elevational view of a motor vehicle, showing my improvements applied thereto;

Fig. 2 is a face view of the instrument board, fractionally shown, this view being taken approximately on the line 2—2 of Fig. 1;

Fig. 3 is an underneath plan view of a portion of the instrument board, illustrating in particular the gearing associated with my indicating instrument; and Fig. 4 is a central sectional view through my improved indicating means and associated gearing, this view being taken on the line 4—4 of Fig. 3.

Referring with more particularity to the parts illustrated in the accompanying drawings, the numeral 5 designates a motor vehicle, 6 denotes the usual radius rod or bar and 7 the connection between said radius rod or bar 6 and a short shaft 8 provided with a worm gear 9 in mesh with worm 10 on the steering post 11. 12 designates the instrument board through which the steering post extends and 13 is the hand wheel whereby to control the steering post for steering the vehicle. All of these parts may be of any usual or conventional type of construction.

The preferred embodiment of my invention as illustrated in the accompanying drawings comprises in its simplest form the casing sections 14 and 15 made preferably in circular form as shown, the section 15 being made to fit partly within the section 14 as clearly shown in Fig. 4 and provided with projecting post members 16 which extend through the interior of the section 14 and also through suitable apertures provided for the purpose in the back plate 17 thereof. The outer or exposed ends of the post members 16 are suitably threaded for receiving the securing nuts 18 whereby the sections are detachably secured together. The posts 16 carry suitable frame plates 19 in which is mounted for rotation a central shaft 20 carrying a power receiving wheel 21 and a speed reduction pinion 22. Also rotatably mounted in the frame plates 19 is a countershaft 23 carrying a gear 24 in mesh with reduction pinion 22 and carrying also within the interior of the section 15 an index 25, the countershaft 23 for this purpose operatively extending through the back plate 26 of the section 15 and also through a dial plate 27 which is secured to said back plate by means of clips 28 preferably struck from said back plate. The dial 27 is provided with an incating scale 29, preferably accompanied as shown in Fig. 2 with the words "Straight", "Left" and "Right". The index 25 cooperates with the scale and words on the dial to show or point out the position of the front wheels of the vehicle with respect to the rear wheels thereof.

The instrument thus provided is preferably received in a suitable opening 30 provided for the purpose in the instrument board 12. Secured to the underside of the instrument board is a bracket 31 formed with arms 32 and 33 designed to carry short shafts 34 and 35 respectively. Short shaft 34 carries a bevel gear 36 and a gear wheel 37, the last mentioned being adapted to turn in an angular opening 38 provided in the casing section 14 for the purpose of engaging the power receiving wheel 21. 39 denotes a flexible shaft which connects the short shaft 35 with a short shaft 40 carried by a bracket 41 attached to the underside of the instrument board adjacent the steering post. Said short shaft 40 carries a helical gear 42 which meshes with a similar gear 43 applied to the steering post immediately below the instrument board as shown in Fig. 1.

In operation, when the front wheels are in alignment with the rear wheels, the index 25 designates zero position under the word "Straight". When the front wheels are turned to the right the index will move accordingly to the right; and similarly when the front wheels are moved to the left the index will accordingly move over the left scale. In turning the front wheels through the maximum angle of adjustment, the hand wheel 13 may be required to turn more than a complete revolution. The index 25 owing to the provision of the reduction gears 22 and 23 will be moved only through the arc represented by the scale 29. From what has been said, taken in connection with the accompanying drawings, it will be understood that the connected casing sections carrying the indicating instrument may be removed from the instrument board since the teeth of the power receiving gear 21 are readily withdrawn from the teeth of the gear 37. Provision is made for readily engaging the teeth of the said gears 21 and 37 upon the application of the instrument to the dash board by providing the back plate 17 of the casing section 14 with dowel pins 44 designated to enter keeper openings 45 provided in the arms 46 projecting from the bracket member 31.

Preferably and as shown the dial plate and cooperating index are enclosed by means of a closing ring 47 carrying a transparent member 48, said closing ring being formed with a flange 49 adapted to be engaged frictionally within the casing section 15.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a motor vehicle, the combination with a casing provided with indicating mechanism and containing gearing for controlling the indicating mechanism, there being an opening in said casing to expose a member of the gearing therein, an instrument board for receiving and holding said casing, a driven gear arranged in the instrument board, and means for guiding said casing upon its application to engage said driven gear with the exposed member of the gear train, substantially as described.

2. The combination with an automobile provided with an instrument board and a steering wheel post passing therethrough, of a bracket supported on the instrument board adjacent the steering wheel post, a worm shaft journalled therein, a worm gear fixed to the steering wheel post and meshing with the worm shaft and imparting rotary movement to the latter upon turning of the steering wheel post, of an indicating casing mounted on the instrument board at a point remote from the steering wheel post and including gear operated indicating means, and a flexible shaft connected with such indicating means and the worm shaft.

In testimony whereof I have signed my name to this specification.

JOHN E. DOMAGALL.